(12) United States Patent
Sheng et al.

(10) Patent No.: US 12,286,315 B2
(45) Date of Patent: Apr. 29, 2025

(54) SYSTEM AND METHOD FOR QUALITY CONTROL IN MANUFACTURE OF PARTS

(71) Applicant: GM Global Technology Operations LLC, Detroit, MI (US)

(72) Inventors: Ziqiang Sheng, Troy, MI (US); Anthony Vincent Tocco, Macomb, MI (US); Timothy J. Byrd, Goodrich, MI (US); Ronald Schabel, Lapeer, MI (US); Shane L. Johnson, Davison, MI (US); Jason W. Whaley, Lake Orion, MI (US); Michael J. Watson, Grand Blanc, MI (US); Kleber M. Cabral, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 657 days.

(21) Appl. No.: 17/692,763

(22) Filed: Mar. 11, 2022

(65) Prior Publication Data

US 2023/0286761 A1 Sep. 14, 2023

(51) Int. Cl.
*G06F 7/00* (2006.01)
*B65G 47/91* (2006.01)
*G06F 30/15* (2020.01)
*G06F 119/18* (2020.01)

(52) U.S. Cl.
CPC ........... *B65G 47/917* (2013.01); *G06F 30/15* (2020.01); *B65G 2201/0294* (2013.01); *B65G 2203/0225* (2013.01); *B65G 2203/0233* (2013.01); *B65G 2203/041* (2013.01); *G06F 2119/18* (2020.01)

(58) Field of Classification Search
CPC .......... B65G 47/917; B65G 2201/0294; B65G 2203/0225; B65G 2203/0233; B65G 2203/041; G06F 30/15; G06F 2119/18; G06F 30/20; G06F 2119/14
USPC ..................................... 700/28–30, 213, 245
See application file for complete search history.

(56) References Cited

U.S. PATENT DOCUMENTS

2006/0156261 A1* 7/2006 Farkash .............. G06F 30/3323
 703/1
2016/0086376 A1* 3/2016 Tang ....................... G06T 17/10
 345/420

* cited by examiner

*Primary Examiner* — Yolanda R Cumbess
(74) *Attorney, Agent, or Firm* — CANTOR COLBURN LLP

(57) ABSTRACT

A system performs a method of manufacturing a vehicle. The system includes a camera, a transport device, and a processor. The camera obtains an image of a part that is to be assembled to the vehicle. The transport device orients the part with respect to a surface and drops the part onto the surface. The processor creates a first model representing the part and a second model representing the surface from the image, places the first model at a selected drop orientation and a selected drop height with respect to the second model, simulates a drop of the first model onto the second model, and determines a change in a dimension of the first model resulting from the simulated drop. The part is dropped onto the surface at the selected drop orientation and the selected drop height when the change in the dimension of the first model meets a criterion.

20 Claims, 5 Drawing Sheets

SYSTEM AND METHOD FOR QUALITY CONTROL IN MANUFACTURE OF PARTS

INTRODUCTION

The subject disclosure relates to preventing dimensional and surface quality defects on a part of a vehicle during a manufacturing process and in particular to a system and method for predicting the formation of defects when the part is being transferred or dropped onto a surface during manufacturing.

Vehicles are manufactured by assembling various parts or sub-components together. A part, such as a sheet metal panel of the vehicle, can be moved through various stations during a manufacturing process before it is assembled to a frame of the vehicle. At each station the part can be deformed or contoured to a designed shape. Robot arms, human hands or other handling devices are used to move the part between stations. The handling device can release the part into the next station of the process or onto a conveyor belt. The action of releasing the part can cause deformations in the part in the form of dents, bent appendages, folding, etc. If these deformations are large enough, they can cause the dimensions of the part to be outside of a specified criterion for the part and surface quality. Accordingly, it is desirable to be able to transfer the part between stations in a manner that reduces the amount and extent of defects caused by the handling process.

SUMMARY

In one exemplary embodiment, a method of manufacturing a vehicle is disclosed. A processor creates a first model representing a part of the vehicle and a second model representing a surface onto which the part is to be placed. The first model is placed, via the processor, at a selected drop orientation and a selected drop height with respect to the second model. The drop of the first model onto the second model is simulated at the processor. A change in a dimension of the first model resulting from the simulated drop is determined. The part is dropped onto the surface at the selected drop orientation and the selected drop height when the change in the dimension of the first model meets a criterion.

In addition to one or more of the features described herein, the method further includes determining a center of gravity of the part on the first model and using the center of gravity of the part to determine the drop orientation for the first model. The method further includes at least one of recommending a redesign for the part and altering a manufacturing step for the part when the change in the dimension of the first model does not meet the criterion. The method further includes determining the criterion by comparing the simulated drop to a real-world drop of the part performed at the selected drop orientation and the selected drop height. The method further includes adjusting at least one of the drop height, the drop orientation, and a geometry of the part when the change in the dimension is greater than or equal to the criterion. The surface further includes one of a frame of the vehicle, a conveyor belt, and a rack. The part is a panel of the vehicle.

In another exemplary embodiment, a system for manufacturing a vehicle is disclosed. The system includes a camera, a transport device, and a processor. The camera is configured to obtain an image of a part that is to be assembled to the vehicle. The transport device is configured to orient the part with respect to a surface and to drop the part onto the surface. The processor is configured to create a first model representing the part and a second model representing the surface from the image, place the first model at a selected drop orientation and a selected drop height with respect to the second model, simulate a drop of the first model onto the second model, and determine a change in a dimension of the first model resulting from the simulated drop.

In addition to one or more of the features described herein, the processor is further configured to determine a center of gravity of the part on the first model and determine the drop orientation for the first model using the center of gravity of the part. The processor is further configured to perform at least one of recommending a redesign of the part and altering a manufacturing step for the part when the change in the dimension of the first model does not meet a criterion. The processor is further configured to determine a criterion by comparing the simulated drop to a real-world drop of the part performed under the selected drop orientation and the selected drop height. The processor is further configured to adjust at least one of the drop height, the drop orientation, and a geometry of the part when the change in the dimension is greater than or equal to a criterion. The surface further includes one of a frame of the vehicle, a conveyor belt, and a rack. The part is a panel of the vehicle.

In yet another exemplary embodiment, a method of manufacturing an article is disclosed. A first model is created at a processor, the first model representing a part that is used in assembly of the article and a second model representing a surface onto which the part is to be placed. The first model is placed, via the processor, at a selected drop orientation and a selected drop height with respect to the second model. The processor simulates a drop of the first model onto the second model. A change in a dimension of the first model resulting from the simulated drop is determined. The part is dropped onto the surface at the selected drop orientation and the selected drop height when the change in the dimension of the first model meets a criterion.

In addition to one or more of the features described herein, the method further includes determining a center of gravity of the part on the first model and using the center of gravity of the part to determine the drop orientation for the first model. The method further includes performing at least one of recommending a redesign of the part and altering a manufacturing step for the part when the change in the dimension of the first model does not meet the criterion. The method further includes determining the criterion by comparing the simulated drop to a real-world drop of the part performed under the selected drop orientation and the selected drop height. The method further includes adjusting at least one of the drop height and the drop orientation when the change in the dimension is greater than or equal to the criterion. The surface further includes one of a frame of the article, a conveyor belt, and a rack.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
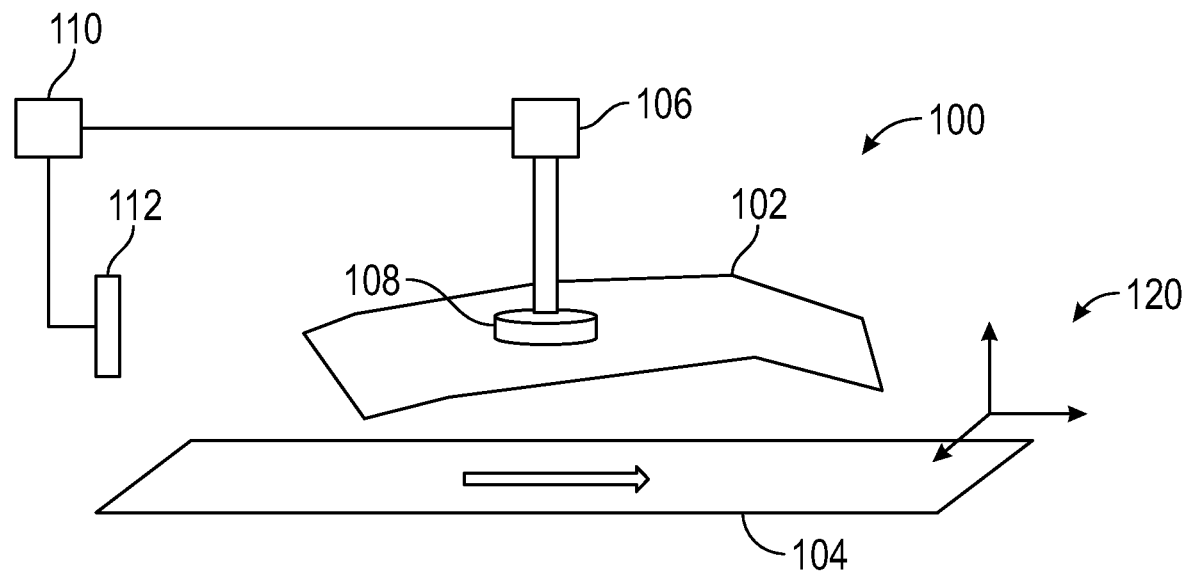
FIG. 1 illustrates a system for transferring a part onto a surface during a manufacturing step of an article.

The following description is merely exemplary in nature and is not intended to limit the present disclosure, its application or uses. It should be understood that throughout the drawings, corresponding reference numerals indicate like or corresponding parts and features.

FIG. 1 illustrates a system 100 for transferring a part 102 onto a surface 104 during a manufacturing step of an article. In various embodiments, the article is a vehicle and the manufacturing step is a step in the production of the vehicle. The part 102 can be a panel of the vehicle, such as a side panel of the vehicle, a fender, a roof, a hood, etc. In an embodiment, the surface 104 can be a frame of the vehicle or other surface that supports the part once the vehicle is completed. In another embodiment, the surface 104 can be a die station for shaping the part, a conveyer belt that is used to transport the part, or a rack that is used to store the part.

The manufacturing process for a part can include a plurality of manufacturing stations and manufacturing steps. The part can begin as a metal sheet. A first die cutting station can be used to shape the sheet metal into a first shape. Subsequent die draw/forming/cutting stations further form the shape until a desired shape is achieved for the part. Between die stations and transportation devices, the part is placed or dropped onto various surfaces. The impact of the drop can cause the part to bend or deform as a result of its weight and dynamic effect. A non-elastic deformation at any step along the manufacturing process can affect the dimensional loyalty of the final part to desired dimensions and is therefore to be reduced or avoided altogether.

The system 100 includes a transport device 106 for transporting the part 102 onto the surface 104. The transport device 106 suspends the part 102 above the surface 104 at a given drop height and drop orientation and then releases the part. The drop height is a distance above the surface 104 from which the part 102 is released by the transport device 106 and the drop orientation is the orientation of the part 102 relative to the surface at which the part 102 is released. The transport device 106 can be a robot arm, in various embodiments. The transport device 106 includes an end effector 108 that is used to grip and release the part when given an appropriate signal. The end effector 108 can be gripping device or a suction device, in various embodiments. The transport device 106 and end effector 108 cooperate to change a pose (i.e., orientation and/or position) of the part 102, as defined with respect to a coordinate system 120.

The system 100 further includes a processor 110 and an imaging device 112. The processor 110 controls operation of the transport device 106 as well as of the imaging device 112. The imaging device 112 captures an image of the part 102 and sends the image to the processor 110 to generate a computer model of the part. The processor 110 performs various numerical calculations using the computer model to determine or predict the effects of dropping or releasing the part 102 onto the surface 104. The processor 110 can simulate an event in which the part 102 is dropped on to the surface 104 at a given drop orientation and drop height to determine the amount and extent of deformation at the part caused by, or as a result of, this event. Various events are simulated at different drop orientations and drop heights to determine an optimal drop orientation and drop height and/or optimal design of the part 102 that reduces or minimizes the amount and extent of deformations on the part 102. If the processor 110 determines that the part 102 cannot be dropped without causing a deformation that is within a given specification requirement, the processor 110 can send a signal to indicate that the design is unable to maintain its shape against forces that are placed on the part during the handling of the part during the manufacturing process. The amount and extent of the deformation can also be used to determine a different design for the part 102 that can reduce the amount and extent of deformation for these handling forces.

Figure 2:
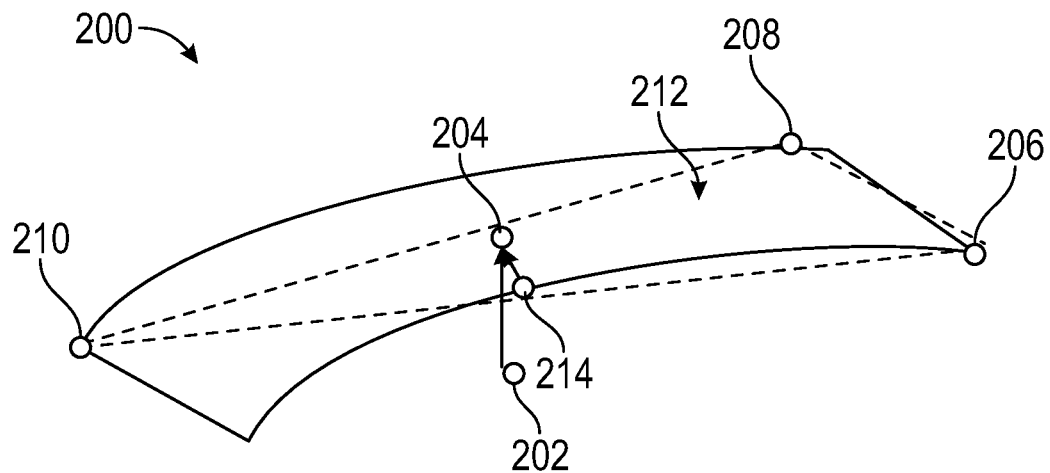
FIG. 2 shows a computer model representative of the part in an illustrative embodiment.

FIG. 2 shows a computer model 200 representative of the part 102 in an illustrative embodiment. The computer model 200 is created by the processor 110 based on one or more images of the part 102 obtained by the imaging device 112 and is shaped to include model features that correspond to the part. The processor 110 creates the computer model 200, which represents a geometric shape of the part (i.e., by discretizing the computer model into mesh elements). The processor 110 determines a center of gravity (CG 202) of the part 102 at the geometric shape of the computer model 200 using known specifications of the part, such as a density of a material of the part, geometry of the part, etc.

In various embodiments, the processor 110 determines a nearest point (nPt 204) and a farthest point (fPt 206) on the computer model 200. The nearest point (nPt 204) is a point on the computer model 200 that is closest to the center of gravity (CG 202) or which has a shortest perpendicular distance to the center of gravity CG, and the farthest point (fPt 206) is the point on the computer model 200 that is farthest from the center of gravity CG or which has a longest distance to the center of gravity CG. For an automotive panel, the part 102 is generally non-planar. Thus, the processor 110 performs operations to determine or characterize a side of the part 102 as being concave or convex.

As shown in FIG. 2, points are extracted from the computer model 200 to represent edge corners of the part 102. These points include point sFPt 208 and point oSPt 210. In the illustrative model, point sFPt 208 is along a 75-degree direction and point oSPt 210 is along a 150-degree direction from a vector line connecting center of gravity (CG 202) to fPt 206, although these points can be selected along any angular direction. Once the points fPt 206, sFPt 208 and oFPt 210 have been identified, the processor 110 defines a plane 212 that passes through all three points. A projection (CG' 214) of the center of gravity (CG 202) into the plane 212 can then be located.

Figure 3:
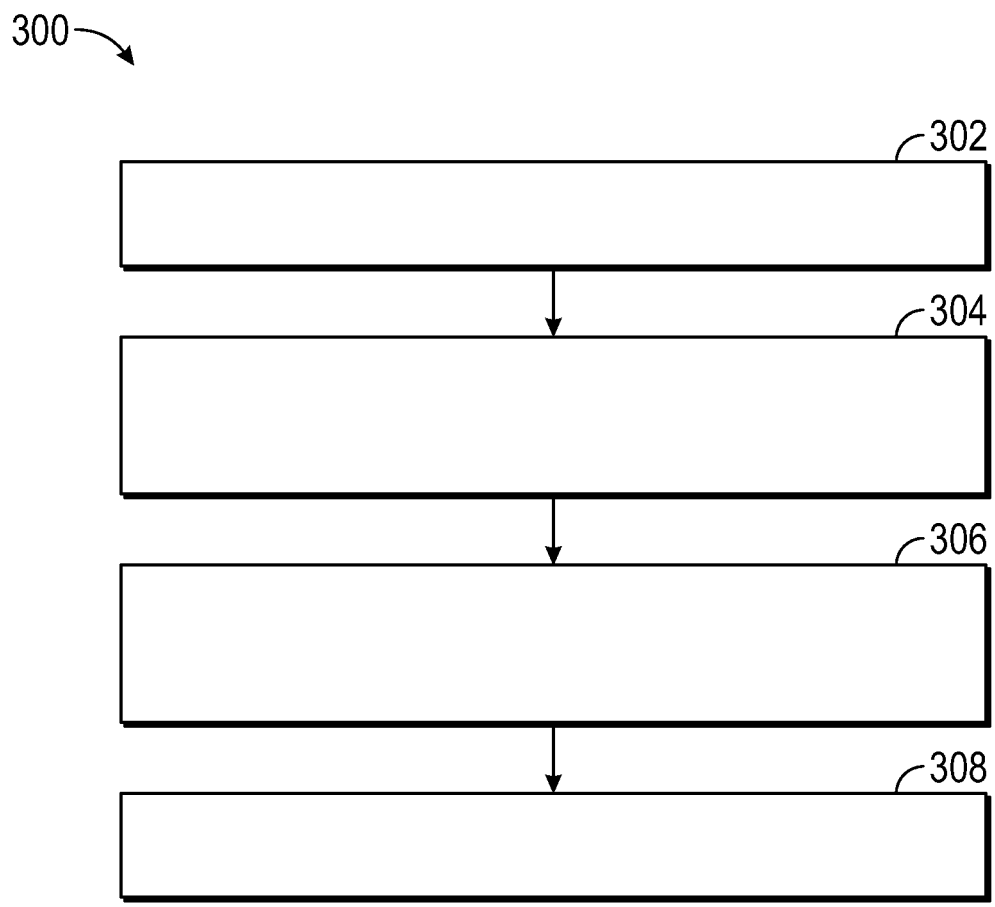
FIG. 3 shows a flowchart of a method for evaluating defects from handling by using drop test simulation.

FIG. 3 shows a flowchart 300 of a method for evaluating defects from handling by using drop test simulation. In box 302, a computer model of the part is discretized into a mesh representation of the geometric shape of the part. The mesh representation is referred to herein as a first model. The first model can be obtained when the part 102 is being held by the transport device 106 or at any other time. In box 304, the first model is placed into an initial position for a simulated drop event. The initial position is defined by initial conditions of drop orientation and drop height. The processor 110 rotates the first model to a selected orientation with respect to a second model that represents the surface 104 and places the first model at a selected height above the second model, onto which the first model drops. In box 306, the processor 110 simulates a drop event in which the first model is dropped onto the second model using the initial conditions. In box 308, an initial evaluation is performed on the mesh representation to identify the occurrence of a local strain. The occurrence of such local strain above a selected strain criterion may determine the need to conduct a virtual quality check on the first model, which is described herein with respect to FIGS. 5 and 6.

Figure 4:
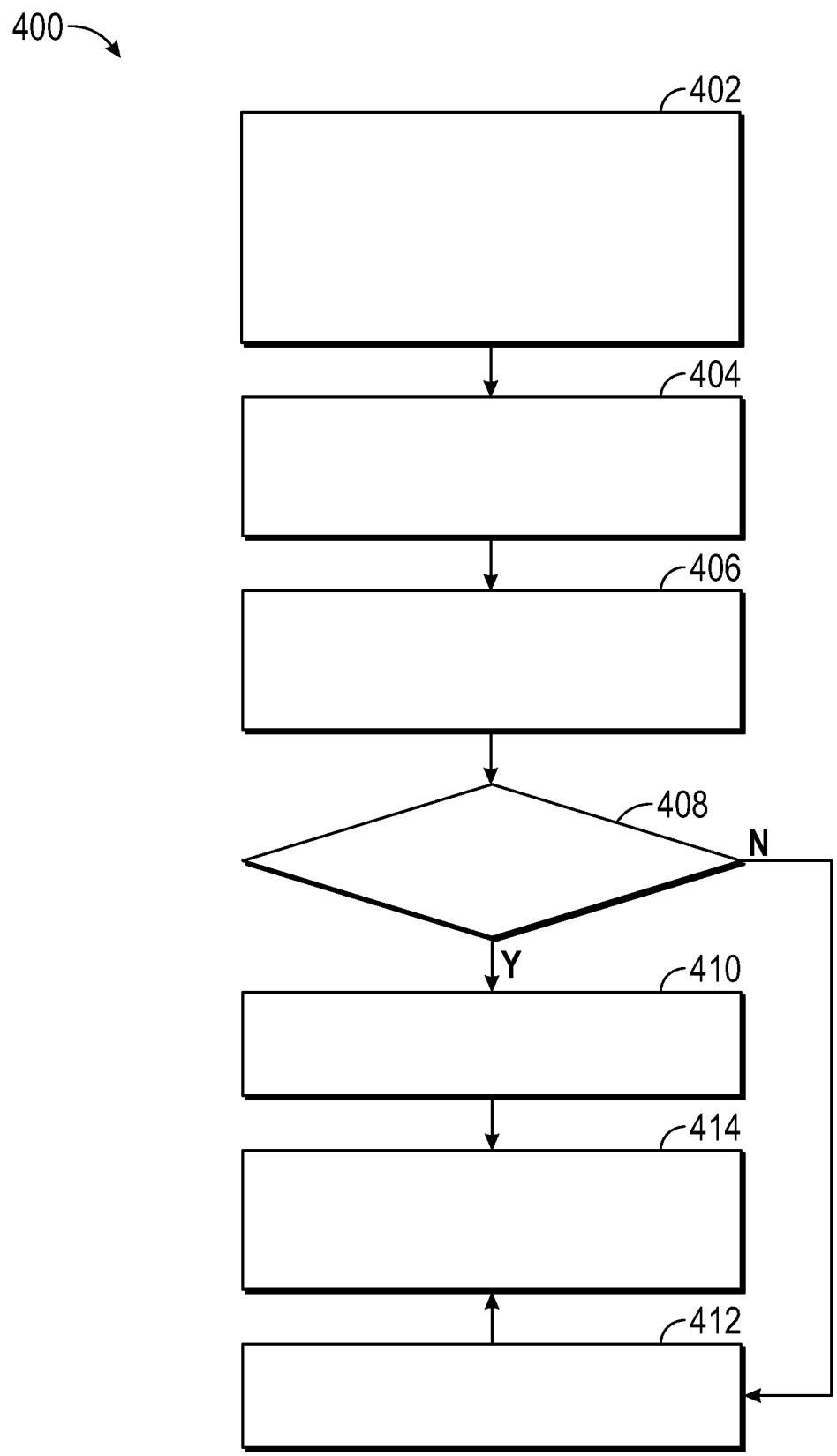
FIG. 4 shows a flowchart of a method of rotating the mesh representation of a first model into a drop orientation.

FIG. 4 shows a flowchart 400 of a method of rotating the mesh representation (i.e., first model) into a drop orientation. In box 402, the center of gravity (CG 202), a nearest point (nPt 204), and farthest point (fPt 206), a first point along a first angular direction (sFPt 208) and a second point along a second angular direction (oFPt 210) are located within the first model. A plane 212 is created that includes fPt 206, sFPt 208 and oFPt 210. In box 404, a projection (CG' 214) of the center of gravity (Cg) is located within the plane 212. In box 406, a distance nDist is determined between the center of gravity (CG 202) and the near point (nPt 204) and a distance tDist is determined between the projection (CG' 214) and the nearest point (nPt 204).

In box 408, the distances nDist and tDist are compared to each other. If tDist>nDist, then the method proceeds to box 410. Otherwise, the method proceeds to box 412. In box 410, the normal direction of the opening is determined to be along a vector pointing from CG to CG'. In box 412, the normal direction of the opening is determined to be along a vector pointing from CG' to CG. From either box 410 or box 412, the method proceeds to box 414 in which the first model is rotated into an initial drop orientation and drop height with respect to the second model.

Figure 5:
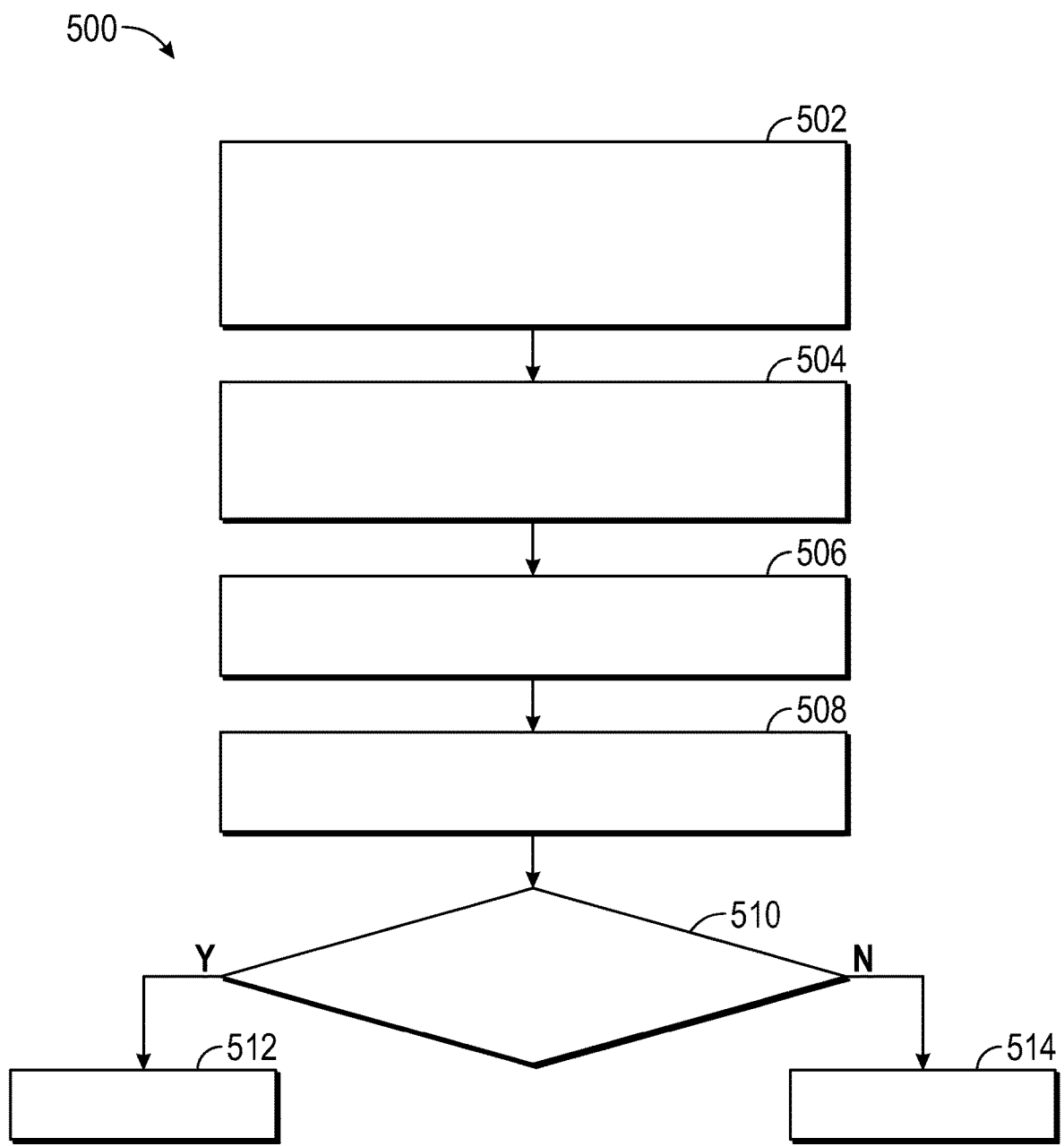
FIG. 5 shows a flowchart of a method for performing a simulation of a virtual quality check at end of drop test simulation.

FIG. 5 shows a flowchart 500 of a method for performing a simulation of a virtual quality check on a part from the end of drop test simulation. In box 502, a mesh model is created for datums based on Geometric Dimensioning and Tolerancing (GD&T) requirements. The first model from the end of the drop test simulation is imported. In box 504, reference features (e.g., holes) of the first panel and the datums are aligned. In box 506, a simulation is performed on the mesh model that takes gravity into account.

In box 508, (after completion of the simulation), the dimensional deviation from the first model to the datums is measured and this dimensional deviation is compared to the virtual quality requirements. In box 510, if the deviation is less than a criterion of the virtual quality requirements, the method proceeds to box 512. Otherwise, the method proceeds to box 514. In box 512, the simulation is marked as passing the drop test. In box 514, the simulation is marked as failing the drop test and the initial conditions are changed for further experimentation and simulation.

Figure 6:
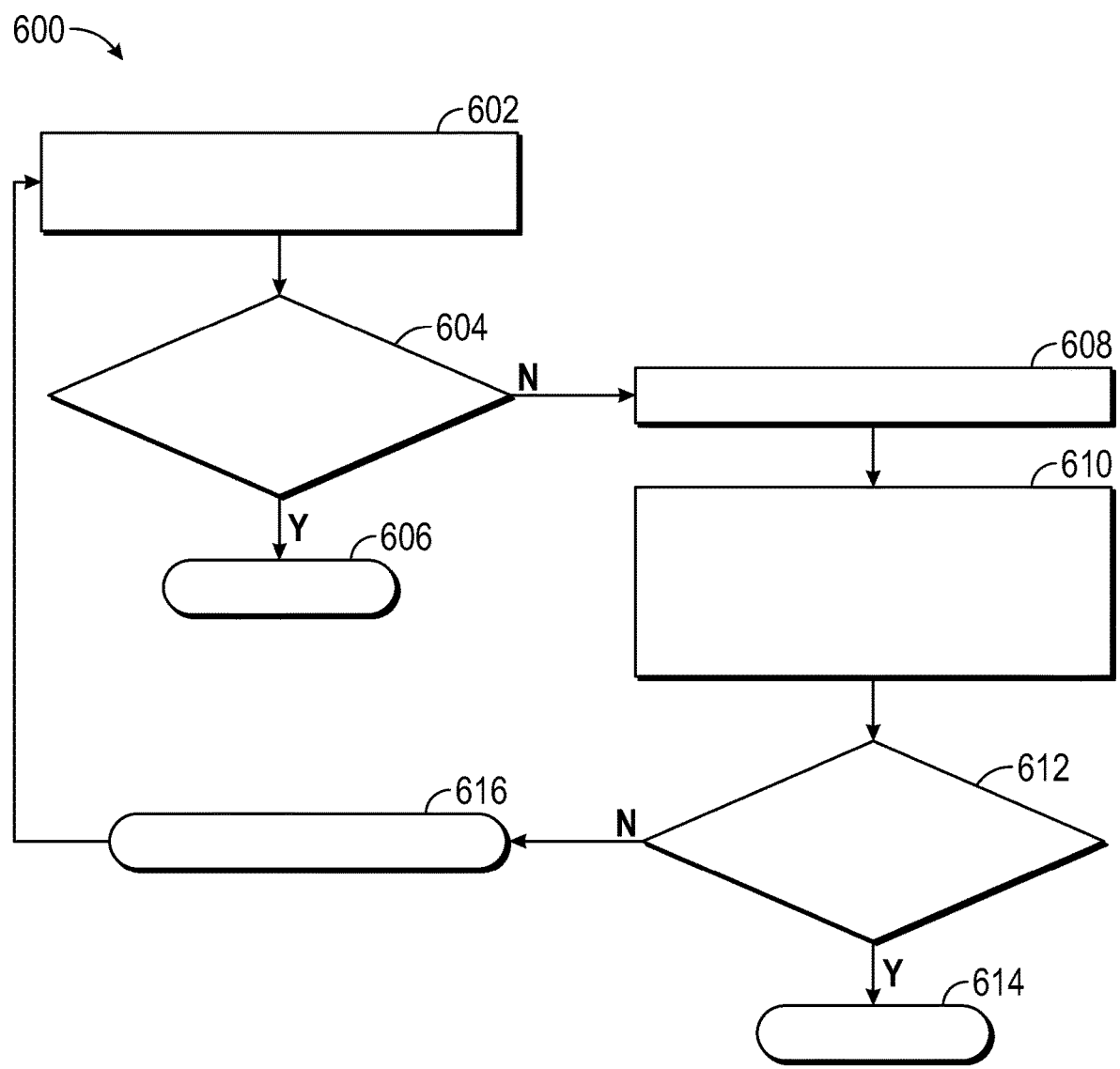
FIG. 6 shows a flowchart of a loop of product/process development by using the proposed method.

FIG. 6 shows a flowchart 600 of a loop of product/process development by using the proposed method. In box 602, the simulation is run of a drop event in which a first model of the part is dropped onto a second model. In box 604, an initial evaluation of the simulation of the drop is performed. The initial evaluation can be based on empirical criterion, such as local strain, which is resulted from drop test simulation. If the resultant strain on the first model is larger than a threshold value, a virtual quality check is conducted. Otherwise, the method proceeds to box 606 in which the first model pass the evaluation. For the virtual quality check, the method proceeds to box 608, where a panel from the end of drop test simulation of box 602 is imported for setup and used in a virtual quality simulation. In box 610, after the virtual quality simulation, the final locations and final distances between the datums and panel are quantified and compared to the criterion in box 612, which can be lined up with GD&T. If the measured deviation is within a criterion, the method proceeds to box 614, in which the drop event passes the simulation. However, if deviation is outside of criterion, the method proceeds to box 616. In box 616, the part is redesigned or the manufacturing process, such as the handling process, is redesigned. Once a new part has been designed or a new manufacturing process has been designed, the method returns to 602 to repeat the evaluation process.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of manufacturing a vehicle, comprising:
   creating, at a processor, a first model representing a part of the vehicle and a second model representing a surface onto which the part is to be placed;
   placing, via the processor, the first model at a selected drop orientation and a selected drop height with respect to the second model;
   simulating, at the processor, a drop of the first model onto the second model;
   determine a change in a dimension of the first model resulting from the simulated drop; and
   dropping the part onto the surface at the selected drop orientation and the selected drop height when the change in the dimension of the first model meets a criterion.

2. The method of claim 1, further comprising determining a center of gravity of the part on the first model and using the center of gravity of the part to determine the drop orientation for the first model.

3. The method of claim 1, further comprising at least one of: (i) recommending a redesign for the part; and (ii) altering a manufacturing step for the part when the change in the dimension of the first model does not meet the criterion.

4. The method of claim 1, further comprising determining the criterion by comparing the simulated drop to a real-world drop of the part performed at the selected drop orientation and the selected drop height.

5. The method of claim 1, further comprising adjusting at least one of: (i) the drop height; (ii) the drop orientation; and (iii) a geometry of the part when the change in the dimension is greater than or equal to the criterion.

6. The method of claim 1, wherein the surface further comprises one of: (i) a frame of the vehicle; (ii) a conveyor belt; and (iii) a rack.

7. The method of claim 1, wherein the part is a panel of the vehicle.

8. A system for manufacturing a vehicle, comprising:
   a camera configured to obtain an image of a part that is to be assembled to the vehicle;
   a transport device configured to orient the part with respect to a surface and to drop the part onto the surface; and
   a processor configured to:
   create a first model representing the part and a second model representing the surface from the image;

place the first model at a selected drop orientation and a selected drop height with respect to the second model;

simulate a drop of the first model onto the second model; and determine a change in a dimension of the first model resulting from the simulated drop.

9. The system of claim 8, wherein the processor is further configured to determine a center of gravity of the part on the first model and determine the drop orientation for the first model using the center of gravity of the part.

10. The system of claim 8, wherein the processor is further configured to perform at least one of: (i) recommending a redesign of the part; and (ii) altering a manufacturing step for the part when the change in the dimension of the first model does not meet a criterion.

11. The system of claim 8, wherein the processor is further configured to determine a criterion by comparing the simulated drop to a real-world drop of the part performed under the selected drop orientation and the selected drop height.

12. The system of claim 8, wherein the processor is further configured to adjust at least one of: (i) the drop height; (ii) the drop orientation; (iii) and a geometry of the part when the change in the dimension is greater than or equal to a criterion.

13. The system of claim 8, wherein the surface further comprises one of: (i) a frame of the vehicle; (ii) a conveyor belt; and (iii) a rack.

14. The system of claim 8, wherein the part is a panel of the vehicle.

15. A method of manufacturing an article, comprising:

creating, at a processor, a first model representing a part that is used in assembly of the article and a second model representing a surface onto which the part is to be placed;

placing, via the processor, the first model at a selected drop orientation and a selected drop height with respect to the second model;

simulating, at the processor, a drop of the first model onto the second model;

determining a change in a dimension of the first model resulting from the simulated drop; and dropping the part onto the surface at the selected drop orientation and the selected drop height when the change in the dimension of the first model meets a criterion.

16. The method of claim 15, further comprising determining a center of gravity of the part on the first model and using the center of gravity of the part to determine the drop orientation for the first model.

17. The method of claim 15, further comprising performing at least one of: (i) recommending a redesign of the part; and (ii) altering a manufacturing step for the part when the change in the dimension of the first model does not meet the criterion.

18. The method of claim 15, further comprising determining the criterion by comparing the simulated drop to a real-world drop of the part performed under the selected drop orientation and the selected drop height.

19. The method of claim 15, further comprising adjusting at least one of: (i) the drop height; and (ii) the drop orientation when the change in the dimension is greater than or equal to the criterion.

20. The method of claim 15, wherein the surface further comprises one of: (i) a frame of the article; (ii) a conveyor belt; and (iii) a rack.

* * * * *